Patented Dec. 30, 1947

2,433,411

UNITED STATES PATENT OFFICE 2,433,411

BENTONITE AND PROTEOLYTIC ENZYME TREATMENT OF BEER

Leo Wallerstein, New York, N. Y., assignor to Wallerstein Company, Inc., New York, N. Y., a corporation of New York No Drawing. Application July 23, 1943, Serial No. 495,846

8 Claims. (Cl. 99—48)

This invention relates to improvements in the production of beer.

This application is a continuation, in part, from an abandoned application filed February 7, 1938, Serial No. 189,165.

It is to be understood that the term "beer" is used herein in its comprehensive sense to include ales and other beverages commonly falling under the general classification of beer.

In the production of beer according to gentral practice, an aqueous extract, known as wort, is derived from the mashing of malted cereals. After mashing, the resultant solution is usually filtered from the grains or other insoluble portions of the mash. In this connection, whenever a filtering process is referred to herein, it is to be understood that it includes any equivalent physical process of separation. The wort is boiled with hops; the hopped wort in filtered from the spent hops; the wort is cooled; and yeast is added to incite fermentation. After this main fermentation, the malt beverage is drawn off and stored for a considerable time, usually at temperatures around 32–40° F., in order that it may ripen and mature. Ordinarily, the beer is finally filtered before packaging.

The ripened and matured beer may become "draught" beer, i. e., beer drawn off into barrels or kegs for prompt consumption without pasteurizing, or "packaged" beer, i. e., beer packaged in bottles, cans or other sealed containers and usually pasteurized. The present invention is more particularly directed toward packaged beer.

During the period of shelf storage, that is, the period between pasteurization and consumption, more or less gradual changes take place in the beer. These changes ordinarily affect the flavor, taste, color and appearance of the beer, rendering it less desirable and, at times, even unsalable. The extent of change depends on various factors such, for example, as time, temperature, climate, agitation, exposure to light, the presence of catalysts, etc. The instability thus referred to may be termed general instability. While many modern beers have had what may be considered a fair degree of stability, marketing conditions have grown more demanding. That is, for example, the shelf life of the beer is often more prolonged and storage and transit conditions more unfavorable. These factors, together with higher standards, call for a higher degree of stability. It follows that even today, instability remains something of a problem.

The ideal beer should have such general stability that the changes above referred to will not occur to any substantial extent, even under the most adverse conditions. The beer should also have proper foaming qualities and should be chill-proof. This last characteristic relates to what may be considered a special kind of instability. Packaged beers, unless treated, are particularly sensitive to cold. Correctly brewed beers are originally clear and brilliant but when subjected to chilling temperatures, such as ice box temperatures, they usually become cloudy or turbid. Treatment to prevent this result is commonly known as "chill-proofing."

Various methods for stabilizing and otherwise improving beer have been proposed from time to time. Among such proposals is the use of certain silicates of alumina which presumably serve to remove colloidally dissolved albumens of the nature of proteids. An example of such silicates is found in the material known as Wyoming bentonite, hereafter referred to in more detail. While the use of bentonite in the production of beer has certain advantages, I have found that its effectiveness as a stabilizing agency is subject to some limitations. My investigations have shown that as the amount of bentonite used is increased, there is a point at which the bentonite starts to impair the foaming qualities of the beer and adversely affect its taste. Thus a dilemma is encountered. If enough bentonite is used to obtain anything like reasonably good stabilization, the beer is apt to have inferior foaming qualities and taste. On the other hand, if the proportion of bentonite is kept small enough to avoid adverse effect on foaming qualities and taste, then the beer will usually lack a desirable degree of stability.

It is an object of the present invention to provide a method of producing beer such that a highly stable beer is obtained without danger of impairing its foaming qualities, taste and other desirable characteristics.

More particularly, it is an object of the invention to provide a method of producing beer that makes possible the use of bentonite and the like and at the same time avoids the dilemma above referred to.

Other objects and advantages of the invention will be apparent from the ensuing description.

I have made the surprising discovery that when both bentonite and an enzymatic preparation are used, under proper conditions, in the preparation of beer, a superior product may be obtained with only a very small proportion of bentonite as compared to the amount considered necessary should bentonite be used alone. Not only may the proportion of bentonite used be so small as to avoid substantially all danger that the foaming qualities and taste of the beer will be impaired, but the beer will have a high degree of stability. In fact, the stabilization effect will usually be superior to anything that can be attained by bentonite alone, regardless of how much bentonite is used.

Other beneficial results of this conjoint use of bentonite and enzymes are hereinafter referred to.

The material known as Wyoming bentonite is apparently so named because it is found in a fairly pure state chiefly in the Fort Benton district of Wyoming. It is also sometimes known as Volclay and Wilkinite.

Bentonite is composed chiefly of the mineral montmorillonite and ordinarily contains small quantities of other minerals such as feldspar, calcite, quartz, volcanic glass, biolite and zeolite. Montmorillonite is a hydrous silicate of alumina, presumably an alumina-pentasilicate. A recognized general formula is

$$(Mg,Ca)O.Al_2S_3.5SiO_2.nH_2O$$

Other minerals may be present as impurities.

An average chemical analysis of Wyoming bentonite is as follows:

| | Per cent |
|---|---|
| Moisture at 105° C | 8.00 |
| Silica (SiO$_2$) | 59.17 |
| Alumina (Al$_2$O$_3$) | 19.08 |
| Ferric oxide (Fe$_2$O$_3$) | 2.79 |
| Ferrous oxide (FeO) | .42 |
| Titanium oxide (TiO$_2$) | .13 |
| Phosphoric acid (P$_2$O$_5$) | .01 |
| Lime (CaO) | .48 |
| Magnesia (MgO) | 2.12 |
| Soda (Na$_2$O) | 2.38 |
| Potash (K$_2$O) | .36 |
| Sulphur (SO$_3$) | .32 |
| Ignition loss | 4.74 |
| | 100.00 |

Wyoming bentonite is characterized, among other things, by its high swelling propensities and its ability to form gels or colloidal suspensions in thin water dilutions. It consists mainly of particles of extreme fineness (70% or more finer than 0.5 micron).

If the bentonite is relatively pure, it may be used as mined except that it is usually preferable to clean it to remove gritty and sandy particles. While the bentonite may be used in verious ways, I have found it convenient to add it in the form of an aqueous suspension. A satisfactory procedure in forming such a suspension is to add bentonite to water slowly and in interrupted doses, with agitation following the final increment. While the concentration may vary, a 5% to 10% suspension gives satisfactory results. The aqueous suspension may then be added to the beer under preparation.

The addition of the bentonite may be at various stages in the preparation of the beer. For example, the bentonite may be added to the wort after saccharification of the mash and before hopping; or after hopping; or after main fermentation. The addition of the bentonite should be followed, at some stage, by a filtration or equivalent step. This, however, need not be a special filtration provided that the bentonite is added at such stage as to be followed by any of the several filtrations ordinarily carried out in the production of the beer.

While the proportional amount of bentonite used may vary, in carrying out the invention to what is now considered the best advantage, I use from about 10 grams to about 25 grams of bentonite per barrel of 31 gallons. I have found that above 25 grams the foaming qualities and taste of the beer are apt to start to be impaired and below 10 grams the stabilizing effect is apt to be less than that desired.

As 10 to 25 grams per barrel is approximately only 10% of the proportions heretofore considered necessary were bentonits to be used alone, it is apparent that the conjoint use of bentonite and an enzymatic preparation makes possible a great and unexpected saving in material. It will also be apparent that the top of the present range is far below the bottom of the range considered necessary were bentonite to be used alone. Consequently, danger of material impairment of foaming qualities and taste is substantially eliminated, and without any sacrifice in the stabilization effect or other results.

The enzymatic preparation used may be any of the enzymes or enzymatic preparations disclosed in my prior Patents Nos. 995,820, 995,824, 995,825, 2,077,447, 2,077,488 and 2,077,449, or any other enzymatic preparations having the same effect.

In carrying out the invention to what is now considered the best advantage, the bentonite and the enzyme should be added separately. This avoids any danger that the bentonite will absorb the enzyme and cause the latter to lose efficiency.

The enzymatic preparation should be added after the wort is boiled and cooled inasmuch as high temperatures tend to destroy enzymatic activity. A suitable stage is after main fermentation, e. g. during tank storage.

While the proportional amount of enzymatic preparation used may vary, satisfactory results may be obtained with smaller proportions than those prescribed in the patents above referred to. The dosage will vary somewhat, depending on the nature of the materials used. Taking pepsin as an example, about 1 gram of 1:3000 strength pepsin per barrel of 31 gallons will give satisfactory results.

A further advantage of the conjoint use of bentonite and enzymes derives from the fact that satisfactory results are obtained with a reduced amount of enzyme as compared to normal chill-proofing specifications. It will be understood that in the process of the present invention, the enzyme, in addition to whatever other roles it may perform, performs its usual role of chill-proofing the beer. It is known that in the use of enzymes for chill-proofing, there is a more or less critical point in the proportion of enzyme that can be properly used. If the enzyme dosage is too large, deleterious effects may follow. But with the conjoint use of bentonite and enzymes, not only is superior stability obtained with surprisingly small amounts of bentonite, but, in addition, satisfactory chill-proofing is attained with dosages of enzyme well below any critical point or range.

The mechanism of whatever inter-relation there may be between the actions of the bentonite and the enzyme in attaining the results described is not entirely understood. Nor is it necessary that it should be. The fact remains that when both bentonite and an enzymatic preparation are used, in accordance with the invention here described, the result is a beer that is highly chillproof and that has a high degree of general stability. And this result is attained with a proportion of enzyme well below any critical range and a proportion of bentonite far below the proportion considered necessary to obtain even inferior stabilization, using bentonite alone, and well below the range where impairment of foaming qualities and taste are apt to result.

It is above stated that both the bentonite and the enzyme may be added at various stages in attaining the basic advantages of the invention. I have found that there are certain supplemental or augmentative and, to an extent, alternative advantages, depending on the stage, the sequence and other conditions of procedure. The brewer, by selecting the proper stage, sequence and the like, may thus obtain the more specific results he desires.

For example, if the bentonite portion of the treatment is effected prior to the addition of the enzymatic preparation, the proportion of enzyme necessary to obtain satisfactory results may be reduced very substantially below the amount heretofore prescribed for normal chill-proofing. In this respect, addition of the bentonite to the wort and addition of the enzyme after main fermentation have been found to give satisfactory results. With the sequence described, the prior action of the bentonite presumably eliminates certain substances which would otherwise have a deterring effect on the action of the enzyme, whereby less enzyme is needed. This factor of saving in enzymatic material is of additional importance from the point of view of expense.

With the sequence just described, particularly advantageous results are obtained if the bentonite portion of the treatment is carried on under elevated temperatures such, for example, as a temperature of around 75° C. Since the wort, in connection with hopping, will have a temperature of that order in the natural course, it is convenient to add the bentonite to the hot wort. With such temperatures, the bentonite treatment may be properly effected in a relatively short time.

By following a different sequence, another supplemental advantage may be attained. It is known that with some beers a fine haze results when proteolytic enzymes, for chill-proofing, are added to the beer at low temperatures, e. g. storage temperatures. This haze appears to be a very finely dispersed precipitate. The cause is not entirely understood and the condition probably varies with the type of malt used. Heretofore, it has not always been possible to effect a thorough elimination of this haze. I have found, however, that by adding bentonite to the cooled beer after the enzymatic preparation has been added to the same, this haze may be readily and thoroughly eliminated. Apparently the bentonite provides a flocculating surface to permit coagulation and ready removal of the finely dispersed precipitate. What are now considered the best results are obtained if the bentonite is added at least several hours after the enzyme is added. It is noted that when the enzymatic preparation is to be added at these reduced temperatures, the enzyme used should be one that has an albumen-clotting effect, for example, papain, bromelin or similar enzymes of vegetable origin.

The basic advantges of the invention are attained with either of these particular sequences. With the bentonite-enzyme sequence the saving in enzymatic material is particularly marked and, if the wort is hot, there is a substantial saving of time. With the enzyme-bentonite sequence, at cool temperatures, more time is required and the saving in enzymatic material may not be as great but the alternative advantage is the thoroughness of haze elimination. It is to be understood that the more particular procedures just described are by way of example and that other procedures may be followed in attaining the basic advantages of the invention.

While the invention has, for convenience, been described in connection with bentonite, it is to be understood that it is not limited to the material commonly known as Wyoming bentonite. Other aluminum silicates of the type of montmorillonite, or materials containing the same in substantial amount and having proper swelling propensities and other desirable characteristics, may be used. Of known materials, however, Wyoming bentonite appears to possess the desirable characteristics in the most favorable degree.

I claim:

1. In the preparation of beer, including mashing material containing malt to form an extractive wort, causing saccharification of the mash, separating the wort from the solids present, boiling the wort with the addition of hops, cooling the wort, causing alcoholic fermentation of the hopped wort, storing, and finally filtering prior to packaging, the improvement which comprises adding, separately, a relatively small amount of the material commonly known as Wyoming bentonite, in the proportion of from about 10 g. to about 25 g. of bentonite per barrel of beer, and a relatively small amount of a proteolytic enzymatic preparation, the bentonite being added at some stage subsequent to saccharification of the mash and prior to final filtration and the enzymatic preparation being added at some stage subsequent to cooling of the wort.

2. In the preparation of beer, including mashing material containing malt to form an extractive wort, causing saccharification of the mash, separating the wort from the solids present, boiling the wort with the addition of hops, cooling the wort, causing alcoholic fermentation of the hopped wort, storing, and finally filtering prior to packaging, the improvement which comprises adding, separately, a relatively small amount of the material commonly known as Wyoming bentonite, in the proportion of from about 10 g. to about 25 g. of bentonite per barrel of beer, and a relatively small amount of a proteolytic enzymatic preparation, the bentonite being added at some stage subsequent to saccharification of the mash and prior to final filtration and the enzymatic preparation being added at some stage subsequent to cooling of the wort and subsequent to the addition of the bentonite.

3. In the preparation of beer, including mashing material containing malt to form an extractive wort, causing saccharification of the mash, separating the wort from the solids present, boiling the wort with the addition of hops, cooling the wort, causing alcoholic fermentation of the hopped wort, storing, and finally filtering prior to packaging, the improvement which comprises adding a relatively small amount of the material commonly known as Wyoming bentonite to the wort, in the proportion of from about 10 g. to about 25 g. of bentonite per barrel of wort, and adding a relatively small amount of a proteolytic enzymatic preparation subsequent to main fermentation.

4. In the preparation of beer, including mashing material containing malt to form an extractive wort, causing saccharification of the mash, separating the wort from the solids present, boiling the wort with the addition of hops, cooling the wort, causing alcoholic fermentation of the hopped wort, storing, and finally filtering prior to packaging, the improvement which comprises adding a relatively small amount of the material commonly known as Wyoming bentonite to the wort while hot in the proportion of from about 10 g. to about 25 g. of bentonite per barrel of wort, and adding a relatively small amount of a proteolytic enzymatic preparation subsequent to main fermentation.

5. In the preparation of beer, including mashing material containing malt to form an extractive wort, causing saccharification of the mash, separating the wort from the solids present, boiling the wort with the addition of hops, cooling the wort, causing alcoholic fermentation of the hopped wort, storing, and finally filtering prior to packaging, the improvement which comprises adding a relatively small amount of the material commonly known as Wyoming bentonite, in the proportion of from about 10 g. to about 25 g. of bentonite per barrel of beer, and a relatively small amount of a proteolytic enzymatic preparation subsequent to main fermentation and at storage temperatures, the bentonite being added a substantial time interval after the addition of the enzymatic preparation.

6. In the preparation of beer, including mashing material containing malt to form an extractive wort, causing saccharification of the mash, separating the wort from the solids present, boiling the wort with the addition of hops, cooling the wort, causing alcoholic fermentation of the hopped wort, storing, and finally filtering prior to packaging, the improvement which comprises adding, separately, the material commonly known as Wyoming bentonite and a relatively small amount of a proteolytic enzymatic preparation, the enzymatic preparation being added subsequent to cooling of the wort and the bentonite being added in a proportion of from about 10 grams to about 25 grams per barrel of 31 gallons.

7. In the preparation of beer, including mashing material containing malt to form an extractive wort, causing saccharification of the mash, separating the wort from the solids present, boiling the wort with the addition of hops, cooling the wort, causing alcoholic fermentation of the hopped wort, storing, and finally filtering prior to packaging, the improvement which comprises adding, separately, a relatively small amount of a hydrous silicate of alumina of the type of montmorillonite, in the proportion of from about 10 g. to about 25 g. of hydrous silicate of alumina per barrel of beer, and a relatively small amount of a proteolytic enzymatic preparation, the silicate of alumina being added at some stage subsequent to saccharification of the mash and prior to final filtration and the enzymatic preparation being added at some stage subsequent to cooling of the wort.

8. In the preparation of beer, the improvement which comprises adding to the beer, after main fermentation and at storage temperatures, a relatively small amount of a proteolytic enzymatic preparation of vegetable origin, and thereafter adding a relatively small amount of the material commonly known as Wyoming bentonite, in the proportion of from about 10 g. to about 25 g. of bentonite per barrel of beer.

LEO WALLERSTEIN.

REFERENCES CITED

The following references are of record in the file of this patent:

UNITED STATES PATENTS

| Number | Name | Date |
| --- | --- | --- |
| 2,291,624 | Heimann | Aug. 4, 1942 |
| 2,043,713 | Saywell | June 9, 1936 |
| 1,892,457 | Cozzolino | Dec. 27, 1932 |
| 2,316,241 | Heimann | Apr. 13, 1943 |
| 2,077,446 | Wallerstein | Apr. 20, 1937 |